United States Patent
Steffenhagen et al.

(10) Patent No.: US 10,793,737 B2
(45) Date of Patent: Oct. 6, 2020

(54) FAST DRY STAIN FORMULA

(71) Applicant: BEHR PROCESS CORPORATION, Santa Ana, CA (US)

(72) Inventors: Mark James Steffenhagen, Ladera Ranch, CA (US); My Diem Doan, Rancho Santa Margarita, CA (US); Dean Alcomendas Gregorio, San Marcos, CA (US)

(73) Assignee: BEHR PROCESS CORPORATION, Santa Ana, CA (US)

( * ) Notice: Subject to any disclaimer, the term of this patent is extended or adjusted under 35 U.S.C. 154(b) by 89 days.

(21) Appl. No.: 15/858,082

(22) Filed: Dec. 29, 2017

(65) Prior Publication Data

US 2019/0203064 A1    Jul. 4, 2019

(51) Int. Cl.
*C09D 15/00*    (2006.01)

(52) U.S. Cl.
CPC .................................... *C09D 15/00* (2013.01)

(58) Field of Classification Search
CPC .................................................... C09D 15/00
See application file for complete search history.

(56) References Cited

U.S. PATENT DOCUMENTS

| | | |
|---|---|---|
| 6,462,117 B1 | 10/2002 | Pourreau et al. |
| 8,092,555 B2 | 1/2012 | Hertz et al. |
| 8,460,399 B2 | 6/2013 | Hertz et al. |
| 8,889,778 B2 | 11/2014 | Duraisamy |
| 9,126,872 B2 | 9/2015 | Smith |
| 9,139,744 B2 | 9/2015 | Sikka et al. |
| 9,221,985 B2 | 12/2015 | Pasin et al. |
| 9,234,164 B2 | 1/2016 | Robinson |
| 9,422,434 B2 | 8/2016 | Ledford et al. |
| 9,528,022 B2 | 12/2016 | Sikka et al. |
| 9,546,299 B2 | 1/2017 | Gesford et al. |
| 9,611,449 B2 | 4/2017 | Robinson |
| 2002/0127415 A1* | 9/2002 | Standke ...................... C08J 7/12 428/447 |
| 2010/0099806 A1* | 4/2010 | Houze .................. C08K 5/0025 524/280 |
| 2010/0331187 A1* | 12/2010 | Williams ................ A01N 25/04 504/291 |
| 2012/0010323 A1* | 1/2012 | Bohannon .............. C09D 15/00 523/122 |
| 2015/0174704 A1 | 6/2015 | Kasper |
| 2015/0299499 A1 | 10/2015 | Ledford et al. |
| 2017/0158881 A1 | 6/2017 | Bisset et al. |
| 2017/0183512 A1 | 6/2017 | Han et al. |

FOREIGN PATENT DOCUMENTS

| | | |
|---|---|---|
| WO | 01/35719 A2 | 5/2001 |
| WO | 03040242 A2 | 5/2003 |
| WO | 14/097309 A1 | 6/2014 |

OTHER PUBLICATIONS

Product information sheet for Dow Corning Z-6690 Water Repellant.*
Product information sheet for Chromaflo Technologies.*
Extended Search Rpt dated May 8, 2019 for EP Appn. No. 18215744. 6, 7 pgs.

\* cited by examiner

*Primary Examiner* — Robert T Butcher
(74) *Attorney, Agent, or Firm* — Brooks Kushman P.C.

(57) ABSTRACT

A stain composition for applying a stain to a wood substrate includes a carbonate ester solvent system, an acrylic resin, a siloxane-containing composition, and an optional pigment composition. The stain composition advantageously has a minimum amount of VOCs.

22 Claims, No Drawings

FAST DRY STAIN FORMULA

TECHNICAL FIELD

In at least one aspect, the present invention is related to stain compositions for forming fast drying non-film forming stain coatings on a substrate.

BACKGROUND

Paint and stain coatings are ubiquitous finding numerous applications for both aesthetic and functional applications. In many applications, stain coatings are applied to improve the aesthetic appeal of a surface by providing a uniform and pleasing appearance. Although stain coating compositions are well known, the prior art compositions tend to be slow drying while undesirably including significant amounts of volatile organic compounds.

Accordingly, there is a need for stain compositions that are fast drying and that include a minimum amount of volatile organic compounds.

SUMMARY

The present invention solves one or more problems of the prior art by providing in at least one embodiment a fast-drying non-film forming stain composition. The stain composition includes a carbonate ester solvent system, an acrylic resin, a siloxane-containing composition, and a pigment composition. Characteristically, the stain composition provides a fast drying, non-film forming stain when applied to wood surfaces. The stain composition can be applied to damp wood and provide early rain resistance. The fast-drying aspect of the present invention provides for a quick return to service in that consumers can prep, stain and use their deck in a short period of time. Advantageously, the stain composition minimizes the use of volatile organic compounds.

DETAILED DESCRIPTION

Reference will now be made in detail to presently preferred compositions, embodiments and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include alkyl, lower alkyl, $C_{1-6}$ alkyl, $C_{6-10}$ aryl, or $C_{6-10}$ heteroaryl; single letters (e.g., "n" or "o") are 1, 2, 3, 4, or 5; percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "alkyl" refers to $C_{1-20}$ inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

Throughout this application, where publications are referenced, the disclosures of these publications in their entireties are hereby incorporated by reference into this application to more fully describe the state of the art to which this invention pertains.

The term "mineral spirits" refers to a petroleum distillate that includes a mixture of aliphatic and alicyclic $C_7$ to $C_{12}$ hydrocarbons.

The term "acrylic resin" refer to a polymer containing a repeating unit derived from acrylic acid or methacrylic acid or derivatives thereof.

The term "stain" refers to a coating that is transparent or partially opaque. Therefore, stains usually include low pigment and filler loading. In a refinement, the pigment loading is less than 10 weight percent of the total weight of the stain composition. In another refinement, the pigment and filler loading is less than 5 weight percent of the total weight of the stain composition.

The term "(meth)acrylic resin" means acrylic resin or methacrylic resin.

The term "acrylic resin" means a polymer containing a repeating unit derived from acrylic acid or derivative thereof.

The term "methacrylic resin" means a polymer containing a repeating unit derived from methacrylic acid or derivative thereof or a repeating unit derived from 2-(trifluoromethyl) acrylic acid or derivative thereof "(meth)acrylic acid" means acrylic acid, methacrylic acid or 2-(trifluoromethyl)acrylic acid.

ABBREVIATIONS

"PCBTF" means parachlorobenzotrifluoride.
"PDMS" means polydimethylsiloxane.
"IPBC" means iodopropynyl butyl carbamate.
"VOC" means low volatile organic compound.

In an embodiment, a stain composition is provided. The stain composition includes a carbonate ester solvent system, an acrylic resin, a siloxane-containing composition, and a pigment composition. Characteristically, the stain composition provides a fast drying, non-film forming stain when applied to wood surfaces.

In a variation, the stain composition includes mineral spirits. Typically, the mineral spirits are present in an amount from about 0 to 20 weight percent of the total weight of the stain composition. In a refinement, the mineral spirits are present in an amount from about 0.5 to 15 weight percent of the total weight of the stain composition. In another refinement, the mineral spirits are present in an amount from about 1 to 10 weight percent of the total weight of the stain composition. In another refinement, the mineral spirits are present in an amount from about 3 to 7 weight percent of the total still weight of the stain composition.

The stain composition includes a carbonate ester solvent system which is a low VOC system that includes at least one carbonate ester. In a variation, the carbonate ester solvent system includes dimethyl carbonate, diethyl carbonate, dipropyl carbonate, propylene carbonate, and/or combinations thereof. In a refinement, the carbonate ester solvent system includes dimethyl carbonate, propylene carbonate, and/or combinations thereof. In a particularly useful refinement, the carbonate ester solvent system includes dimethyl carbonate and propylene carbonate. Typically, the carbonate ester solvent system is present in an amount from about 50 to 90 weight percent of the total weight of the stain composition. In a refinement, dimethyl carbonate and propylene carbonate are each independently present in an amount from about 0 to 80 weight percent of the total weight of the stain composition with the proviso that in combination dimethyl carbonate and propylene carbonate are present in an amount from about 50 to 90 weight percent of the total weight of the stain composition. In another refinement, dimethyl carbonate is present in an amount from about 40 to 80 weight percent of the total weight of the stain composition and propylene carbonate are is present in an amount from about 5 to 40 weight percent of the total weight of the stain composition.

As set forth above, the stain composition includes an acrylic resin. Suitable acrylic resins include homopolymers or copolymers of methacrylate, acrylate, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, isobornyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, or pentafluorophenyl methacrylate. In a refinement, the acrylic resin includes homopolymers or copolymers of n-butyl acrylate, n-butyl methacrylate, Suitable acrylic resins include homopolymers or copolymers of or isobornyl methacrylate. In a refinement, the acrylic resin includes polymers or copolymers of n-butyl acrylate, n-butyl methacrylate, t-butyl acrylate, t-butyl methacrylate, isobutyl acrylate, or isobornyl methacrylate. Copolymers of the acrylates set forth above can be formed with each other or with methacrylate or acrylate. Examples of useful acrylic resins include, but are not limited to, PARALOID® B67 and PARALOID® B67 commercially available from The Dow Chemical Company and DIANAL® BR-106, DIANAL® BR-107, AND DIANAL® BR-101 commercially available from Dianal America, Inc. In a refinement, the acrylic resin is present in an amount of at least 0.1, 0.2, 0.5, 1, or 2 weight percent and in an amount of at most 15, 10, 8, 7, 6 or 5 weight percent. In particular, the acrylic resin is present in an amount from about 0.5 to 15 weight percent of the total weight of the stain composition.

As set forth above, the stain composition also includes a water repellant and in particular, a siloxane-containing water repellent. Typically, the silane-containing composition is present in an amount from 0.5 to 10 weight percent of the total weight of the stain composition. In a variation, the siloxane-containing composition includes a silicone. In a refinement, the siloxane-containing composition includes a mixture of a silane and a siloxane. In this refinement, the silane and siloxane are each independently present in an amount of at least 0.1, 0.2, 0.5, 1, or 2 weight percent and in an amount of at most 15, 10, 8, 7, 6 or 5 weight percent. In a further refinement, the mixture further includes a fluoropolymer. In this refinement, the fluoropolymer is present in an amount of at least 0.1, 0.2, 0.5, 1, or 2 weight percent and in an amount of at most 15, 10, 8, 7, 6 or 5 weight percent. In a refinement, the siloxanes are organosilanes and/or organopolysiloxanes. Suitable silicone resins can be of the conventional MT, MO, T, MQT, MDT, MDQ, DT, DTQ, and MDTO types. In these resins, which are commercially available, the definition of M, D, T, and Q units is well-known (see, Noll, Chemistry and Technology of Silicones, Academic Press, New York, 1968, pp. 3 to 7). Examples of silicones, organosilanes and organopolysiloxanes are found in U.S. Pat. Pub. No. 2014021371; the entire disclosure of which is hereby incorporated by reference. Organosilanes are examples of useful silanes in the siloxane-containing composition. In a variation, the organosilanes are monomeric. In a refinement, the organosilanes are hydrolyzable and therefore can be used in partly hydrolyzed form. In a further refinement, the organosilanes are crosslinkable through condensation following application of the stain. The organosilanes can be reactive silanes which contain silicon-bonded alkoxy or hydroxyl groups, preferably alkoxy groups. Preferred alkoxy groups are methoxy and ethoxy groups. The unhydrolyzed silanes thus correspond to the formula:

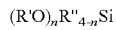 $(R'O)_nR''_{4-n}Si$  I where n is 1, 2, or 3;
R' is an organo group, preferably an alkyl group, and most preferably a $C_{1-4}$ alkyl group, and
R" is a carbon-silicon bonded organo group, preferably an alkyl group, and most preferably a $C_{1-20}$ alkyl group. In a refinement, the stain composition includes a silane having formula I where R" is a higher alkyl. In another refinement, R" is lower alkyl. In yet another refinement, R" is $C_{1-18}$ alkyl. A useful example of such a silane has formula $C_{16}H_{33}Si(OCH_3)_3$. Silanes containing aminoalkyl groups, e.g. where at least one R" is an aminopropyl or N-(2-aminoethyl)-3-aminopropyl group can also be used. An example is N-(2-aminoethyl)-3-aminopropylmethyldimethoxysilane. In a refinement, the organosilanes or their partial hydrolysates are present in an amount of 0.01 to 5 weight percent of the total weight of the stain composition. Examples of PDMS water repellants can include an amino functional PDMS. Examples of useful siloxane-containing compositions include alkoxy silanes, siloxane, and fluoropolymer. Examples of useful solventless silicones can be based on a mixture of silane and siloxane and/or alkylsilicone resins with alkoxy groups. Specific examples of siloxane-containing water repellants include, but are not limited to, Wacker Silres BS-38, Wacker Silres BS-290, Wacker Silres BS-66, Wacker Silres BS-68, Wacker WR-1100, Wacker Silane 25013 VP and Dow Corning Z-6690. Examples of useful fluoropolymers are set forth in U.S. Pat. Nos. 5,919, 527; 6,120,892; and 7,459,186; the entire disclosures of which are hereby incorporated by reference.

The stain compositions set forth herein typically include a pigment composition. Typically, the pigment composition is solvent acrylic-based colorant. In a refinement, the pigment compositions include a dye or pigment in a solvent system. Examples of such solvent systems include nonionic and anionic dispersing and wetting agents and polyglycol. Specific useful pigment compositions are the Chromaflo Chroma-Chem Pigment Dispersions from Chromaflo Technologies (e.g., 1852 Transparent Yellow Oxide, 1054 Transparent Red Oxide, 9956 Carbon Black, 2075 Raw Umber, 5558 Phthalo Green Blue, etc.). Other useful pigments include dispersions of carbon black. Typically, the pigment composition is present in an amount of at least 0, 0.1, 0.5, 1, or 2 weight percent and at most 10, 7, 6, 5, or 4 weight percent of the total weight of the stain composition.

In a variation, the stain compositions set forth herein include a mildewcide. Typically, the mildewcide is present in an amount from about 1 to 4 weight percent of the total weight of the stain composition. In a refinement, the mildewcide is present in an amount from about 1 to 3 weight percent of the total weight of the stain composition. In another refinement, the mildewcide is present in an amount from about 1.5 to 2.5 weight percent of the total weight of the stain composition. An example of a useful mildewcide is 3-iodo-2-propynyl butylcarbamate ("IPBC").

In a variation, the stain compositions set forth herein include a suspending agent and in particular, a clay suspending agent. Typically, the suspending agent is present in an amount from about 0.1 to 2 weight percent of the total weight of the stain composition. In a refinement, the suspending agent are present in an amount from about 0.1 to 2 weight percent of the total weight of the stain composition. In another refinement, the suspending agent are present in an amount from about 10.1 to 0.5 weight percent of the total weight of the stain composition.

In typical applications, the paint composition can include one or more additives in relatively low amounts in order to provide important properties to the paint composition. Typical additives include rheology modifiers, surfactants, defoamers, organic solvents, dispersants, coalescents, light stabilizer (e.g., Hindered amine light stabilizer such as Tinuvin 292), biocides and combinations thereof. In a variation, the additives are collectively present in an amount from about 0.1 to 10 weight percent. In a refinement, the additives are collectively present in an amount from about 1 to 5 weight percent. It should be appreciated that other well-known additives can be utilized to provide additional properties. In a refinement, each of the following additives are independently optionally present in an amount greater than 0.01, 0.05, 1.0, 2.0, 3.0 or 4.0 weight present of the total weight of the stain composition and in an amount less than, 15.0, 10.0, 9.0, 8.0, 7.0, or 6.0 weight present of the total weight of the stain composition: rheology modifiers, surfactants, defoamers, organic solvents, dispersants, coalescents, light stabilizer and biocides.

The following examples illustrate the various embodiments of the present invention. Those skilled in the art will recognize many variations that are within the spirit of the present invention and scope of the claims.

Examples of useful formulation of the stain composition are provided in the following Tables 1-6.

Examples 1. Clear Stain Composition

| Material | Generic Use Level | wt % |
|---|---|---|
| Solid acrylic resin | 0.5-15 | 5.00 |
| Dimethyl Carbonate | 0-80% | 70.00 |
| Propylene Carbonate | 0-80% | 12.97 |
| Mineral Spirits | 0-20% | 5.00 |
| Fluoronated silane | 0.5-5.0% | 1.00 |
| Silane/siloxane mixture | 0.5-5.0% | 2.50 |
| Hexadecyl silane | 0.5-5.0% | 0.00 |
| Mildewcide | 1.0-4.0% | 2.00 |
| Bentone clay suspending agent | 0.1-1.0% | 0.20 |
| Surfactant | 0.1-1.0% | 0.20 |
| Trans Yellow Oxide Solvent acrylic based colorant | 0-5.0% | 1.13 |

| Material | Generic Use Level | wt % |
|---|---|---|
| Trans Red Oxide Solvent acrylic based colorant | 0-5.0% | 0.00 |
| Raw Umber Solvent acrylic based colorant | 0-5.0% | 0.00 |
| Solvent acrylic based colorant | 0-5.0% | 0.00 |
| Hindered amine light stabilizer | 0-5.0% | 0.00 |
| | | 100.00 |

Examples 2. Cedar Naturaltone Stain Composition

| Material | Generic Use Level | wt % |
|---|---|---|
| Solid acrylic resin | 0.5-15 | 5.00 |
| Dimethyl Carbonate | 0-80% | 70.00 |
| Propylene Carbonate | 0-80% | 11.92 |
| Mineral Spirits | 0-20% | 5.00 |
| Fluoronated silane | 0.5-5.0% | 1.00 |
| Silane/siloxane mixture | 0.5-5.0% | 2.50 |
| Hexadecyl silane | 0.5-5.0% | 0.00 |
| Mildewcide | 1.0-4.0% | 2.00 |
| Bentone clay suspending agent | 0.1-1.0% | 0.20 |
| Surfactant | 0.1-1.0% | 0.20 |
| Trans Yellow Oxide Solvent acrylic based colorant | 0-5.0% | 1.40 |
| Trans Red Oxide Solvent acrylic based colorant | 0-5.0% | 0.75 |
| Raw Umber Solvent acrylic based colorant | 0-5.0% | 0.00 |
| Carbon Black Solvent acrylic based colorant | 0-5.0% | 0.03 |
| Hindered amine light stabilizer | 0-5.0% | 0.00 |
| | | 100.00 |

Examples 3. Redwood Stain Composition

| Material | Generic Use Level | wt % |
|---|---|---|
| Solid acrylic resin | 0.5-15 | 5.00 |
| Dimethyl Carbonate | 0-80% | 70.00 |
| Propylene Carbonate | 0-80% | 10.81 |
| Mineral Spirits | 0-20% | 5.00 |
| Fluoronated silane | 0.5-5.0% | 1.00 |
| Silane/siloxane mixture | 0.5-5.0% | 2.50 |
| Hexadecyl silane | 0.5-5.0% | 0.00 |
| Mildewcide | 1.0-4.0% | 2.00 |
| Bentone clay suspending agent | 0.1-1.0% | 0.20 |
| Surfactant | 0.1-1.0% | 0.20 |
| Trans Yellow Oxide Solvent acrylic based colorant | 0-5.0% | 0.00 |
| Trans Red Oxide Solvent acrylic based colorant | 0-5.0% | 3.25 |
| Raw Umber Solvent acrylic based colorant | 0-5.0% | 0.00 |
| Carbon Black Solvent acrylic based colorant | 0-5.0% | 0.04 |
| Hindered amine light stabilizer | 0-5.0% | 0.00 |
| | | 100.00 |

Examples 4. Chocolate Stain Composition

| Material | Generic Use Level | wt % |
|---|---|---|
| Solid acrylic resin | 0.5-15 | 5.00 |
| Dimethyl Carbonate | 0-80% | 70.00 |
| Propylene Carbonate | 0-80% | 11.33 |
| Mineral Spirits | 0-20% | 5.00 |
| Fluoronated silane | 0.5-5.0% | 1.00 |
| Silane/siloxane mixture | 0.5-5.0% | 2.50 |
| Hexadecyl silane | 0.5-5.0% | 0.00 |
| Mildewcide | 1.0-4.0% | 2.00 |
| Bentone clay suspending agent | 0.1-1.0% | 0.20 |
| Surfactant | 0.1-1.0% | 0.20 |
| Trans Yellow Oxide Solvent acrylic based colorant | 0-5.0% | 1.40 |
| Trans Red Oxide Solvent acrylic based colorant | 0-5.0% | 0.75 |
| Raw Umber Solvent acrylic based colorant | 0-5.0% | 0.60 |
| Carbon Black Solvent acrylic based colorant | 0-5.0% | 0.02 |
| Hindered amine light stabilizer | 0-5.0% | 0.00 |
| | | 100.00 |

Examples 5. Padre Brown Stain Composition

| Material | Generic Use Level | wt % |
|---|---|---|
| Solid acrylic resin | 0.5-15 | 5.00 |
| Dimethyl Carbonate | 0-80% | 70.00 |
| Propylene Carbonate | 0-80% | 11.60 |
| Mineral Spirits | 0-20% | 5.00 |
| Fluoronated silane | 0.5-5.0% | 1.00 |
| Silane/siloxane mixture | 0.5-5.0% | 2.50 |
| Hexadecyl silane | 0.5-5.0% | 0.00 |
| Mildewcide | 1.0-4.0% | 2.00 |
| Bentone clay suspending agent | 0.1-1.0% | 0.20 |
| Surfactant | 0.1-1.0% | 0.20 |
| | 0-5.0% | 0.00 |

-continued

| Material | Generic Use Level | wt % |
|---|---|---|
| Trans Red Oxide Solvent acrylic based colorant | 0-5.0% | 1.00 |
| Raw Umber Solvent acrylic based colorant | 0-5.0% | 1.50 |
| Carbon Black Solvent acrylic based colorant | 0-5.0% | 0.00 |
| Hindered amine light stabilizer | 0-5.0% | 0.00 |
| | | 100.00 |

Examples 6. Cordovan Brown Stain Composition

| Material | Generic Use Level | wt % |
|---|---|---|
| Solid acrylic resin | 0.5-15 | 5.00 |
| Dimethyl Carbonate | 0-80% | 70.00 |
| Propylene Carbonate | 0-80% | 10.40 |
| Mineral Spirits | 0-20% | 5.00 |
| Fluoronated silane | 0.5-5.0% | 1.00 |
| Silane/siloxane mixture | 0.5-5.0% | 2.50 |
| Hexadecyl silane | 0.5-5.0% | 0.00 |
| Mildewcide | 1.0-4.0% | 2.00 |
| Bentone clay suspending agent | 0.1-1.0% | 0.20 |
| Surfactant | 0.1-1.0% | 0.20 |
| Trans Yellow Oxide Solvent acrylic based colorant | 0-5.0% | 0.00 |
| Trans Red Oxide Solvent acrylic based colorant | 0-5.0% | 0.00 |
| Raw Umber Solvent acrylic based colorant | 0-5.0% | 3.50 |
| Carbon Black Solvent acrylic based colorant | 0-5.0% | 0.00 |
| Hindered amine light stabilizer | 0-5.0% | 0.00 |
| Phthalo Green Blue Solvent acrylic based colorant | 0-5.0% | 0.20 |
| | | 100.00 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A stain composition comprising:
a carbonate ester solvent system including dimethyl carbonate;
an acrylic resin;
a siloxane-containing composition;
a pigment composition; and
an organoclay suspending agent.

2. The stain composition of claim 1 wherein the organoclay suspending agent is present in an amount from about 0.1 to 2 weight percent of the total weight of the stain composition.

3. The stain composition of claim 1 wherein the carbonate ester solvent system further includes a combination selected from the group consisting of diethyl carbonate, dipropyl carbonate, propylene carbonate, and combinations thereof.

4. The stain composition of claim 1 wherein the carbonate ester solvent system further includes propylene carbonate.

5. The stain composition of claim 1 wherein the acrylic resin includes homopolymers or copolymers of methacrylate, acrylate, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, isobornyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, or pentafluorophenyl methacrylate.

6. The stain composition of claim 1 wherein the acrylic resin includes homopolymers or copolymers of n-butyl acrylate, n-butyl methacrylate, t-butyl acrylate, t-butyl methacrylate, isobutyl acrylate, isobutyl methacrylate, or isobornyl methacrylate.

7. The stain composition of claim 1 wherein the acrylic resin includes polymers or copolymers of methyl methacrylate with n-butyl acrylate, n-butyl methacrylate, t-butyl acrylate, t-butyl methacrylate, isobutyl acrylate, or isobornyl methacrylate.

8. The stain composition of claim 1 wherein the siloxane-containing composition includes a silicone.

9. The stain composition of claim 1 wherein the siloxane-containing composition includes a mixture of a silane and a siloxane.

10. The stain composition of claim 9 wherein the mixture further includes a fluoropolymer.

11. The stain composition of claim 9 wherein the silane is an alkoxy silane.

12. The stain composition of claim 11 wherein the silane is an alkoxy silane having the following formula:

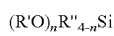

where n is 1, 2, or 3;
R' is a $C_{1-4}$ alkyl group; and
R" is a $C_{1-18}$ alkyl group.

13. The stain composition of claim 11 wherein the alkoxy silane has formula $C_{16}H_{33}Si(OCH_3)_3$.

14. The stain composition of claim 1 wherein dimethyl carbonate is present in an amount from about 40 to 80 weight percent of the total weight of the stain composition and propylene carbonate is present in an amount from about 5 to 40 weight percent of the total weight of the stain composition.

15. The stain composition of claim 14 wherein the acrylic resin is present in an amount from about 0.5 to 15 weight percent of the total weight of the stain composition.

16. The stain composition of claim 1 further comprising a mildewcide.

17. The stain composition of claim 1 further comprising mineral spirits.

18. The stain composition of claim 1 wherein the pigment composition is solvent acrylic-based colorant.

19. The stain composition of claim 1 further comprising an additive selected from the group consisting of rheology modifiers, surfactants, defoamers, organic solvents, dispersants, coalescents, light stabilizer, preservatives and combinations thereof.

20. The stain composition of claim 19 wherein the additive is a hindered amine light stabilizer.

21. The stain composition of claim 1 further comprising a fluorinated silane.

22. The stain composition of claim 1 further comprising hexadecyl silane.

* * * * *